(12) United States Patent
Nibe (10) Patent No.: US 8,433,252 B2
(45) Date of Patent: Apr. 30, 2013

(54) METHOD FOR CONTROLLING COMMUNICATION IN WIRELESS TERMINAL AND WIRELESS TERMINAL

(75) Inventor: Keiji Nibe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/552,987

(22) Filed: Sep. 2, 2009

(65) Prior Publication Data

US 2009/0325506 A1 Dec. 31, 2009

Related U.S. Application Data

(63) Continuation of application No. PCT/JP2007/054711, filed on Mar. 9, 2007.

(51) Int. Cl.
*H04B 1/00* (2006.01)
*H04B 7/00* (2006.01)
*H04B 17/00* (2006.01)

(52) U.S. Cl.
USPC .......................................... 455/69; 455/67.11

(58) Field of Classification Search ............... 455/69, 455/67.1, 63, 67.4, 522, 92, 67.11, 63.1, 455/67.14, 574, 115.1, 115.2, 127.1, 127.2, 455/127.5, 226.1, 226.2
See application file for complete search history.

(56) References Cited

U.S. PATENT DOCUMENTS

| | | | | |
|---|---|---|---|---|
| 6,973,289 B2 * | 12/2005 | Ue et al. | | 455/69 |
| 6,978,130 B2 * | 12/2005 | Nagata | | 455/422.1 |
| 7,417,963 B2 * | 8/2008 | Chen et al. | | 370/311 |
| 7,636,551 B2 * | 12/2009 | Ue et al. | | 455/63.1 |
| 2006/0018277 A1 | 1/2006 | Petrovic et al. | | |
| 2006/0056346 A1 | 3/2006 | Vadgama et al. | | |
| 2006/0120403 A1 | 6/2006 | Murata et al. | | |

FOREIGN PATENT DOCUMENTS

| | | |
|---|---|---|
| JP | 2004129085 | 4/2004 |
| JP | 2006-60789 | 3/2006 |
| JP | 200687100 | 3/2006 |
| JP | 2006140635 | 6/2006 |
| JP | 2006157134 | 6/2006 |

OTHER PUBLICATIONS

International Search Report dated Jun. 12, 2007 for PCT/JP2007/054711.

* cited by examiner

*Primary Examiner* — Eugene Yun
(74) *Attorney, Agent, or Firm* — Fujitsu Patent Center (57) ABSTRACT

An UE receives a downlink data channel from a BS, calculates a reception quality value related to the downlink data channel, monitors a transmission rate of an uplink data channel to BS, and reduces the calculated reception quality value based on a result of the monitoring.

7 Claims, 9 Drawing Sheets

| E-DCH COMM RATE [kbps] | CQI CONT VALUE |
|---|---|
| 62 | 1 |
| 78 | 2 |
| 105 | 3 |
| 143 | 4 |
| 170 | 5 |
| 207 | 6 |
| 293 | 7 |
| 356 | 8 |
| 419 | 9 |
| 568 | 10 |
| 667 | 11 |
| 784 | 12 |
| 1026 | 13 |
| 1162 | 14 |
| 1494 | 15 |
| 1604 | 16 |
| 1885 | 17 |
| 2099 | 18 |
| 2379 | 19 |
| 2649 | 20 |
| 2949 | 21 |
| 3226 | 22 |
| 4374 | 23 |
| 5138 | 24 |

| CQI | TRANSPORT BLOCK SIZE |
|---|---|
| 1 | 137 |
| 2 | 173 |
| 3 | 233 |
| 4 | 317 |
| 5 | 377 |
| 6 | 461 |
| 7 | 650 |
| 8 | 792 |
| 9 | 931 |
| 10 | 1262 |
| 11 | 1483 |
| 12 | 1742 |
| 13 | 2279 |
| 14 | 2583 |
| 15 | 3319 |
| 16 | 3565 |
| 17 | 4189 |
| 18 | 4664 |
| 19 | 5287 |
| 20 | 5887 |
| 21 | 6554 |
| 22 | 7168 |
| 23 | 9719 |
| 24 | 11418 |
| 25 | 14411 |
| 26 | 17237 |
| 27 | 21754 |
| 28 | 23370 |
| 29 | 24222 |
| 30 | 25558 |

FIG. 9

METHOD FOR CONTROLLING COMMUNICATION IN WIRELESS TERMINAL AND WIRELESS TERMINAL

CROSS-REFERENCE TO RELATED APPLICATION

This application is a continuation Application of a PCT international application No. PCT/JP2007/054711 filed on Mar. 9, 2007 in Japan, the entire contents of which are incorporated by reference.

FIELD

The embodiments discussed herein are related to a method for controlling communication in a wireless terminal and a wireless terminal.

BACKGROUND

There is a wideband-code division multiple access (W-CDMA) scheme which is one of wireless communication schemes. The W-CDMA scheme is one of wireless communication interfaces defined as the International Mobile Telecommunications-2000 (IMT-2000) and is regarded as one of the representative wireless communication schemes.

The W-CDMA scheme enables multimedia accesses of voice, videos, data, or the like, at a transmission speed of up to 384 kbps.

In addition, wireless communication schemes known as the high-speed downlink packet access (HSDPA) and the high-speed uplink packet access (HSUPA) on the basis of the technique of the W-CDMA scheme have been researched and developed recently.

The HSDPA is a technique for achieving a high-speed downlink packet transmission in the downlink direction which is the direction from a base station (BS) to a terminal (user equipment: UE). The HSUPA is a technique for achieving a high-speed uplink packet transmission at the uplink direction which is the opposite to the direction of the HSDPA. The HSDPA is standardized as the 3rd Generation Partnership Project Release 5 (3GPP release 5) and the HSUPA is standardized as the 3GPP release 6.

Figure 5:
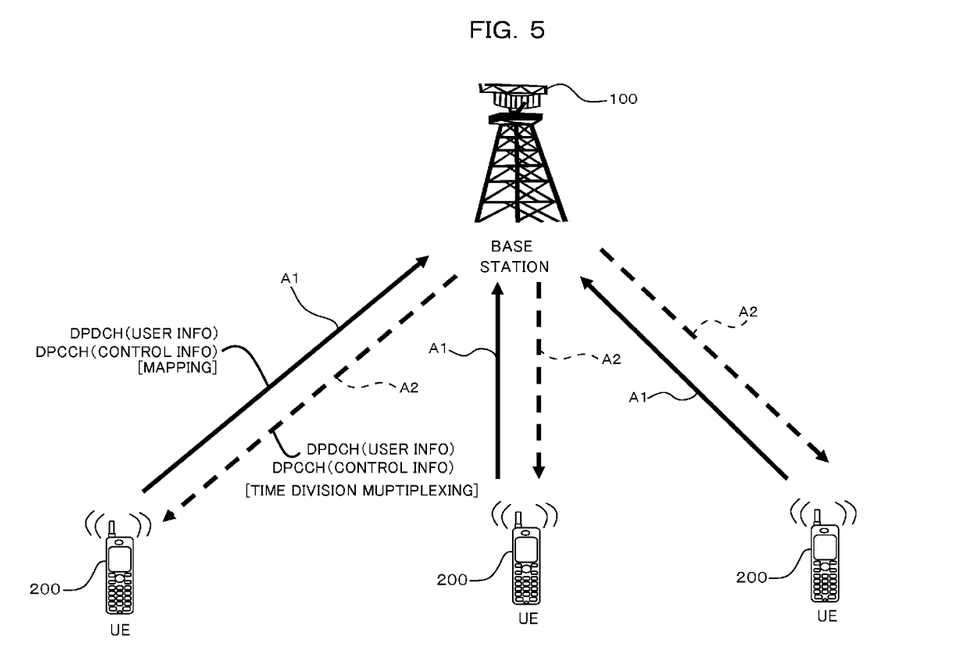
FIG. 5 is a conceptual drawing illustrating communication according to the W-CDMA.

FIG. 5 is a conceptual drawing illustrating communications according to the W-CDMA. As depicted in FIG. 5, a wireless communication is carried out between a base station (BS) 100 and one or more terminals (UEs) 200 according to the W-CDMA scheme.

For the uplink, the dedicated physical data Channel (DPDCH) that is a channel for transmitting user information and the dedicated physical control channel (DPCCH) that is a channel for transmitting control information are each mapped to the in-phase component (I axis) and the quadrature component (Q axis) of the quadrature phase shift keying (QPSK) modulation and sent to the BS 100 (see solid line arrow A1).

For the downlink, the DPDCH and the DPCCH are time division multiplexed and sent to the UEs 200 (see dashed line arrow A2). Note that these links are discrete channels that are allocated to each UE 200 in order to carry out transmission exclusive relative to other UEs 200.

Figure 6:
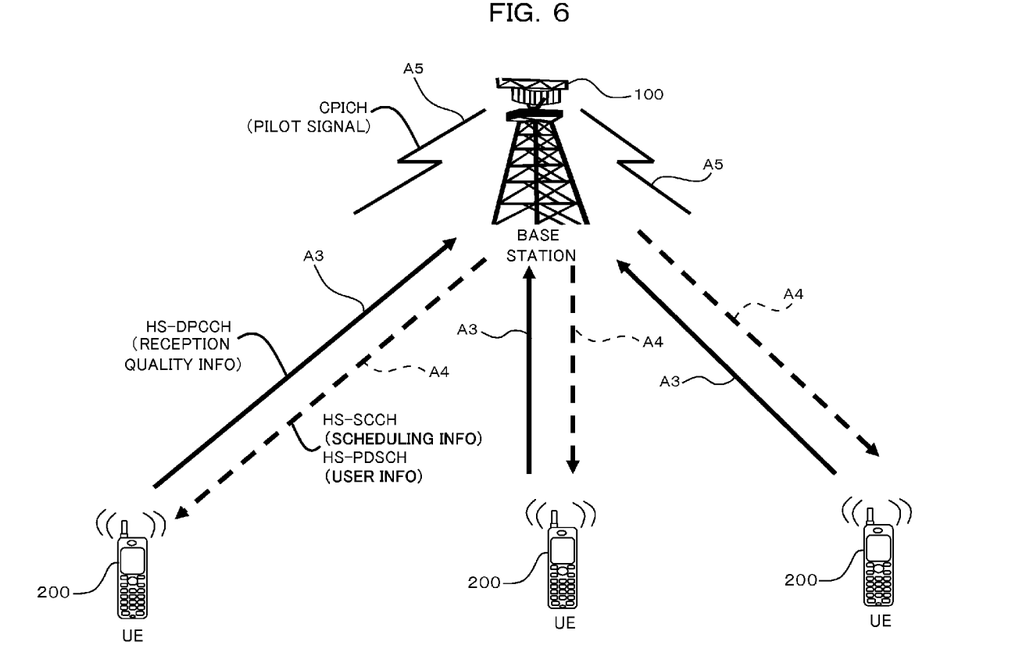
FIG. 6 is a conceptual drawing illustrating communication according to the HSDPA.

Next, the concept of the communication of the HSDPA is illustrated in FIG. 6. As depicted in FIG. 6, communications according to the HSDPA are carried out for downlink transmission from the BS 100 to the UEs 200.

More specifically, each UE 200 receives a pilot signal (a signal commonly recognized by the BS 100 and the UE 200) sent from the BS 100 on a pilot channel (CPICH: common pilot channel) (see reference symbol A5), measures the transmission environment, i.e., the reception quality (signal interference ratio: SIR) of the downlink on the basis of the pilot signal for that UE 200, calculates an channel quality indicator (CQI) report value that is the reception quality value on the downlink on the basis of the measurement result, and reports the CQI report value to the BS 100 on a high-speed dedicated physical control channel (HS-DPCCH) (see solid line arrow A3).

The BS 100 carries out scheduling to select preferentially a predetermined number of UEs 200 that have better transmission environments on the basis of the reception quality value (CQI report values) reported by the UEs 200. Suppose a certain UE 200 is selected as a result of the scheduling, the BS 100 notifies that UE 200 of scheduling information (including the type of modulation, the transmission volume, or the like) on a high-speed shared control channel (HS-SCCH) (see dashed line arrow A4). The UE 200 sets the functions of the local terminal 200 on the basis of the received scheduling information.

The BS 100 then sends user information to the UE 200 on a wireless channel called a high-speed physical downlink shared channel (HS-PDSCH) (see dashed line arrow A4). The HS-PDSCH for transmitting the user information is a common channel that are used by each of the UEs 200 wherein one time-divided time slot is shared by one UE 200 or multiple UEs 200, enabling a high-speed downlink access of up to 14.4 Mbps.

Figure 7:
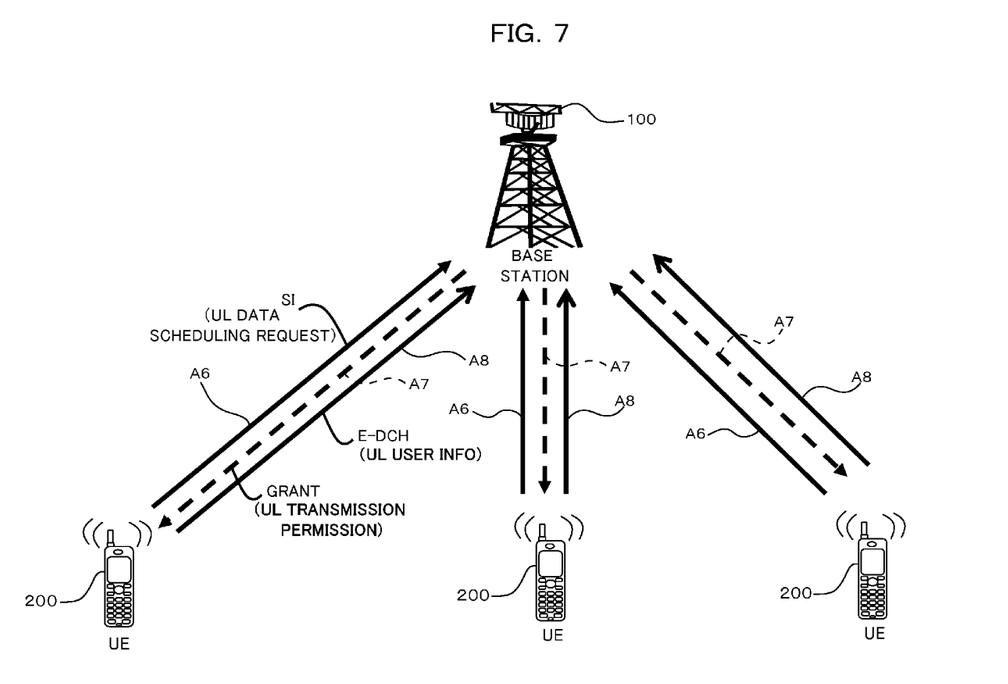
FIG. 7 is a conceptual drawing illustrating communication according to the HSUPA.

The concept of the communication of the HSUPA is now illustrated in FIG. 7. As depicted in FIG. 7, communications according to the HSUPA are carried out for uplink transmission from the UEs 200 to the BS 100.

More specifically, the UEs 200 send scheduling information (SI) as uplink data transmission requests to the BS 100 (see solid line arrow A6).

The BS 100 sums the multiple SIs sent from the UEs 200, carries out scheduling to determining the transmission timings for the UEs 200 to carry out an uplink transmission on the basis of communication qualities of the UEs 200, priorities of uplink data, or the like, and sends a Grant to an UE 200 as an uplink transmission permission (see dashed line arrow A7). Note that there are two types of Grants, namely, absolute grants and relative grants, wherein absolute grants are used for notifying uplink transmission rates or the like at a predetermined intervals, and relative grants are used for notifying update of the information that has been notified the absolute grant.

The UEs 200 send user information to the BS 100 via respective channels called enhanced dedicated channels (E-DCHs) in the order of permissions given to the terminals 200 to carry out an uplink transmission by receiving a Grant from the BS 100 (see solid line arrow A8), thereby enabling a high-speed uplink access. Note that it is considered that the transmission speed of the E-DCH will be 2-5 Mbps.

The HSDPA employs the adaptive code modulation scheme, and for example, is characterized in that the QPSK modulation scheme and the 16QAM modulation scheme are switched adaptively according to the wireless environment between the BS 100 and the UEs 200. In addition, in order to achieve an adaptive modulation scheme as described above, CQI report values used by the UEs 200 to report the reception environments to the BS 100 are defined wherein different formats of different transmission speeds are defined according to CQI=1 to 30, for example, in a CQI table.

Each UE 200 then measures the reception environment, and basically reports the maximum CQI report value to the BS 100 not exceeding the block error rate (BLER) (=0.1) of the HS-PDSCH supposing that the HS-PDSCH is received within three slots after one slot before the CQI report value is sent in the environment.

Figure 8:
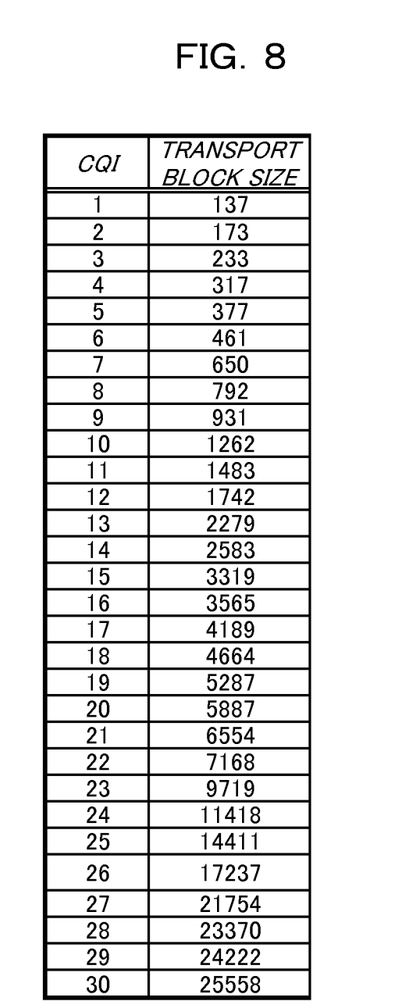
FIG. 8 is a diagram illustrating one example of a CQI table.

Here, one example of the CQI table is illustrated in FIG. 8. As depicted in FIG. 8, each of the CQI report values from the UEs 200 is related to a transport block size of downlink data, and the BS 100 determines a transport block size of the downlink data and a downlink transport format on the basis of a CQI report value from an UE 200.

On the other hand, on the HSUPA, the BS 100 monitors the total uplink interference (reception power) of its own base station, and compares the reception power with a threshold value. Thereby, the BS 100 designates a transmission rate in an absolute value to an UE 200 that has an uplink transmission request using an E-AGCH (command to designate an absolute value of the maximum rate), or commands the UE 200 to increase, maintain or decrease the transmission rate using or an E-RGCH (command to designate relative value of the maximum rate). When the UE 200 has uplink transmission data, the UE 200 sends a scheduling request (SI) to the BS 100.

Note that there are techniques disclosed in the following Patent Documents 1-3 as techniques related to methods for controlling scheduling in the W-CDMA including the HSUPA.

The following Patent Document 1 discloses that a wireless base station assigns an upper limit of the uplink packet rate that is permitted to a mobile station according to the downlink CQI report value received from the mobile station. The following Patent Document 2 discloses that a base station switches a mobile terminal from the scheduling mode that is currently used for uplink transmission to another scheduling mode on the basis of the estimated buffer occupation. In addition, the following Patent Document 3 discloses that a base station enhances the utilization efficiency of the uplink by broadcasting a certain second indication indicating statuses of all user terminals using a common channel.

Patent Document 1: Japanese Laid-Open Patent Publication No. 2006-140635

Patent Document 2: Japanese Laid-Open Patent Publication No. 2006-60789

Patent Document 3: Japanese Laid-Open Patent Publication No. 2006-87100

When downlink data received on the HS-PDSCH undergoes required L2 data processing and at least part of the downlink data is sent to the BS 100 in real-time on the E-DCH, for example, the communication rate in the uplink direction may differ from the communication rate in the downlink direction due to the difference in the communication environment in the downlink direction (i.e., the data transmission direction from the BS 100 to the UEs 200) and the communication environment in the downlink direction (i.e., the data transmission direction from the UEs 200 to the BS 100), scheduling processing at the BS 100, or the like. For this reason, the UEs 200 are adapted to absorb the above-described difference in the communication rates by storing uplink data to the buffer.

However, when the communication rate in the uplink direction becomes lower than the communication rate in the downlink direction due to HSUPA scheduling processing by the BS 100, for example, data storage processing (buffer processing) to the buffer may be delayed and the buffer may overflow. As a result, data communication processing may be hindered from being executed correctly.

None of Patent Documents 1-3 described above discloses or suggests such issues and solutions for the issues.

SUMMARY (1) According to an aspect of the embodiment, a method includes a method for controlling communication in a wireless terminal that receives a downlink data channel from a wireless base station, and determines a reception quality value related to the downlink data channel and report the reception quality value to the wireless base station, the method including: monitoring, on the wireless terminal, a transmission rate on an uplink data channel to the wireless base station; and reducing, on the wireless terminal, the determined reception quality value based on a result of the monitoring.

(2) According to an aspect of the embodiment, an apparatus includes a wireless terminal that receives a downlink data channel from a wireless base station, and determines a reception quality value related to the downlink data channel and report the reception quality value to the wireless base station, the wireless terminal including: a monitoring section that monitors a transmission rate on an uplink data channel to the wireless base station; and a reducing section that reduces the determined reception quality value based on a result of the monitoring by the monitoring section.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Figure 9:
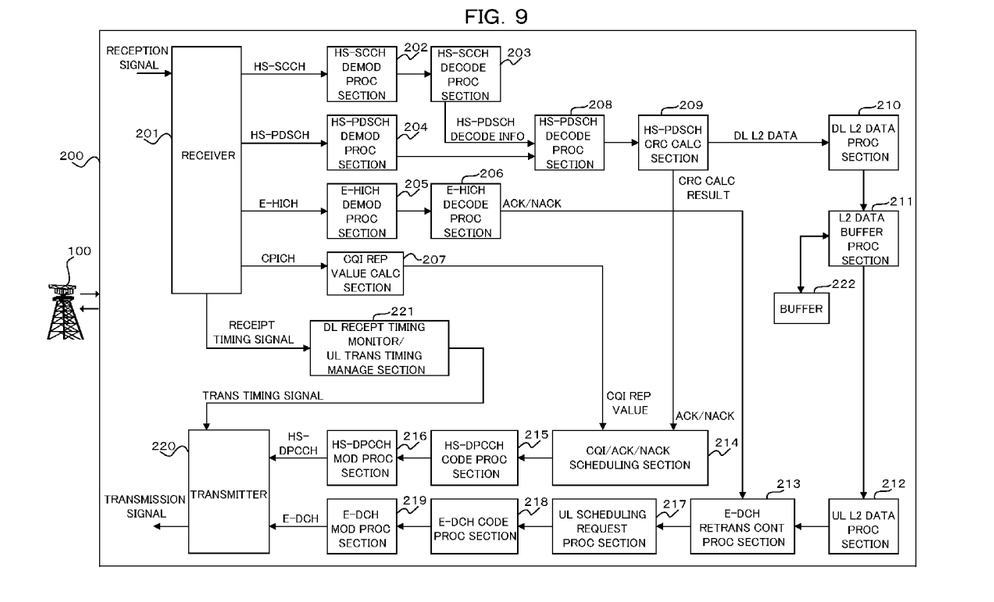
FIG. 9 is a block diagram illustrating an example of the configuration of the main portion of an UE including a transmission function of an SI (scheduling request) in the HSUPA communication.

An example of the configuration of the main portion of an UE 200 including a transmission function of SIs (scheduling requests) described above is depicted in FIG. 9. The UE 200 depicted in FIG. 9 is configured to include, for example, a receiver 201, an HS-SCCH demodulation processing section 202, an HS-SCCH decode processing section 203, an HS-PDSCH demodulation processing section 204, an E-HICH demodulation processing section 205, an E-HICH decode processing section 206, a CQI report value calculation section 207, an HS-PDSCH decode processing section 208, HS-PDSCH CRC calculation section 209, a downlink layer 2 (L2) data processing section 210, a layer 2 (L2) data buffer processing section 211, an uplink layer 2 (L2) data processing section 212, an E-DCH retransmission control processing section 213, a CQI/ACK/NACK scheduling processing section 214, an HS-DPCCH code processing section 215, an HS-DPCCH modulation processing section 216, an uplink scheduling request processing section 217, an E-DCH code processing section 218, an E-DCH modulation processing section 219, transmitter 220, a downlink reception timing monitor/uplink transmission timing management section 221, and a buffer 222.

In the UE 200 configured as above, a signal received at a reception antenna is input to the receiver 201 (omitted from the drawing); path detection, despreading processing, or the like are carried out in the receiver 201; and the channels of the CPICH, enhanced hybrid ARQ indicator channel (E-HICH), HS-SCCH, and HS-PDSCH are separated. Note that the E-HICH is a channel used to send a delivery confirmation result indication (ACK or NACK) regarding uplink transmission data from the BS 100 to the UE 200.

Among them, the CPICH (pilot signal) is input to the CQI report value calculation section 207 and is used to calculate a CQI report value. That is, the downlink reception SIR is measured on the basis of this reception pilot signal, and the CQI report value of the downlink is calculated on the basis of the result of this measurement. The CQI report value undergoes code processing, modulation processing, and wireless transmission processing through the CQI/ACK/NACK scheduling processing section (herein after, simply referred to as "scheduler") 214, the HS-DPCCH code processing section 215, and the HS-DPCCH modulation processing section 216; and the transmitter 220, and is sent to the BS 100 on the HS-DPCCH. Note that the reception pilot signal is also used to determine channel estimation values of the E-HICH, HS-SCCH and the HS-PDSCH.

In addition, the HS-SCCH separated at the receiver 201 is demodulated with the channel being compensated using the channel estimation value obtained on the basis of the reception pilot signal at the HS-SCCH demodulation processing section 202, and decoded by the HS-SCCH decode processing section 203. The result of this decode is input to the HS-PDSCH decode processing section 208 since the result includes information required for decoding the HS-PDSCH (e.g., the coding scheme, coding rate, or the like).

In addition, the HS-PDSCH separated at the receiver 201 is demodulated with the channel being compensated using the channel estimation value at the HS-PDSCH demodulation processing section 204, is decoded using the decode result from the HS-SCCH decode processing section 203 by the HS-PDSCH decode processing section 208, and undergoes a CRC calculation and an error check at the HS-PDSCH CRC calculation section 209.

As a result, the decode data free from an error (having the CRC calculation result of being acceptable) is input to the downlink L2 data processing section 210 as a reception data on the downlink layer 2, and undergoes a predetermined L2 data processing. In addition, the CRC calculation result described above is input to the scheduler 214. ACK information in the case of the CRC calculation result being acceptable or NACK information in the case of the result being not acceptable is scheduling together with the CQI report value; undergoes code processing, modulation processing, and wireless transmission processing through the HS-DPCCH code processing section 215, the HS-DPCCH modulation processing section 216, and the transmitter 220; and is sent to the BS 100 on the HS-DPCCH.

In addition, the E-HICH separated at the receiver 201 is demodulated with the channel being compensated using the channel estimation value at the E-HICH demodulation processing section 205, and is further decoded by the E-HICH decode processing section 206. Here, an ACK is decoded for uplink transmission data that is determined as error free by the BS 100, or a NACK is decoded for uplink transmission data that is determined having an error by the BS 100, which is input to the E-DCH retransmission control processing section 213. The uplink transmission data for which a NACK is decoded by the E-DCH retransmission control processing section 213 undergoes predetermined retransmission control processing; undergoes uplink scheduling processing, code processing, modulation processing, and wireless transmission processing through the uplink scheduling request processing section 217, the E-DCH code processing section 218, E-DCH modulation processing section 219, and the transmitter 220 as described later; and is sent to the BS 100 on the E-DCH.

At least part of the downlink reception data that undergoes L2 data processing at the downlink L2 data processing section 210 is undergoes predetermined buffer processing by the L2 data buffer processing section 211 and the buffer 222, and is input to the uplink L2 data processing section 212.

On the other hand, for the uplink, when the uplink L2 data processing section 212 has uplink L2 data to be sent to the BS 100, the uplink L2 data is input to the uplink scheduling request processing section 217 together with uplink transmission data for the above-described retransmission; undergoes code processing, modulation processing, and wireless transmission processing through the E-DCH code processing section 218, E-DCH modulation processing section 219, and the transmitter 220; and is sent to the BS 100 on the E-DCH.

That is, at least one of at least part of downlink reception data from the downlink L2 data processing section 210, uplink L2 data from the uplink L2 data processing section 212, and uplink transmission data for retransmission is sent to BS 100 on the E-DCH. In addition, an uplink SI is generated by the uplink scheduling request processing section 217; undergoes code processing, modulation processing, and wireless transmission processing through the E-DCH code processing section 218, E-DCH modulation processing section 219; and the transmitter 220, and is sent to the BS 100 on the E-DCH.

Note that the transmission timing for the HS-DPCCH and E-DCH by the transmitter 220 is managed on the basis of a transmission timing signal from the downlink reception timing monitor/uplink transmission timing management section (herein after, simply refereed to as "timing management section") 221. More specifically, the timing management section 221 manages transmission timings (transmission slots) of the HS-DPCCH and E-DCH on the basis of the transmission timing (frame timing) determined by frame synchronization processing at the receiver 201, and controls transmission timing by the transmitter 220 to be a certain timing according to those transmission timings.

Hereinafter, exemplary embodiments will be described with reference to accompanying drawings. The following exemplary embodiments are merely examples and do not intend to exclude various modifications and variations to the proposed method and/or apparatus that are not specifically described herein. Rather, various modifications or variations may be made to the embodiments (for example, by combining the exemplary embodiments) without departing from the scope and spirit of the proposed method and/or apparatus.

(A) Description of One Embodiment

Figure 1:
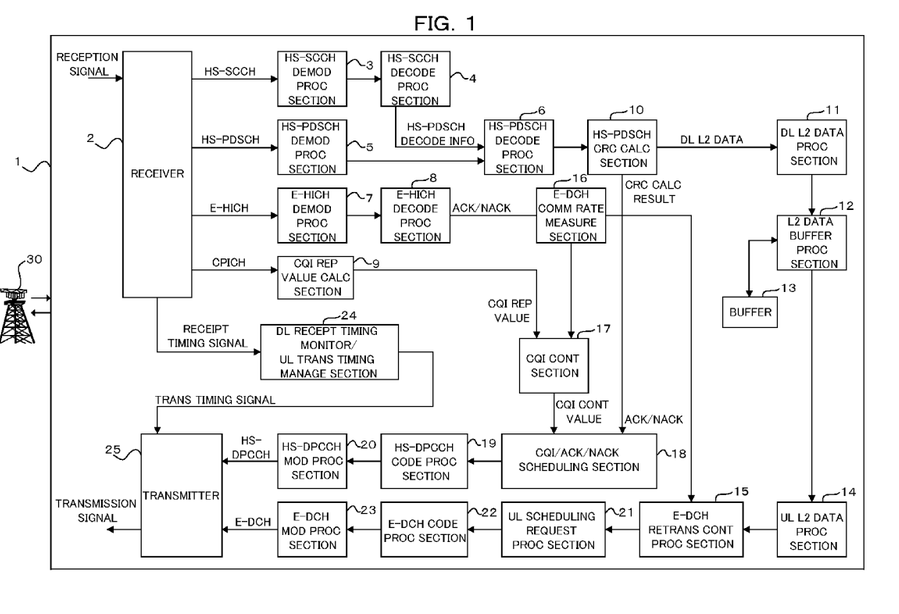
FIG. 1 is a block diagram illustrating a configuration of the main portion of a wireless terminal (UE) according to one embodiment.

FIG. 1 is a block diagram illustrating a configuration of the main portion of a wireless terminal (UE) according to one embodiment. An UE 1 depicted in FIG. 1 includes functions to receive a downlink data channel (HS-PDSCH) from at least one wireless base station (BS) 30, calculate a CQI report value related to the HS-PDSCH, and report the CQI report value to the BS 30. The UE 1 is configured to include, for example, a receiver 2, an HS-SCCH demodulation processing section 3, an HS-SCCH decode processing section 4, an HS-PDSCH demodulation processing section 5, an HS-PDSCH decode processing section 6, an E-HICH demodulation processing section 7, an E-HICH decode processing section 8, a CQI report value calculation section 9, an HS-PDSCH CRC calculation section 10, a downlink layer 2 (L2) data processing section 11, a layer 2 (L2) data buffer processing section 12, a buffer 13, an uplink layer 2 (L2) data processing section 14, an E-DCH retransmission control processing section 15, an E-DCH communication rate measurement section 16, a CQI control section 17, a CQI/ACK/NACK scheduling processing section 18, an HS-DPCCH code processing section 19, an HS-DPCCH modulation processing section 20, an uplink scheduling request processing section 21, an E-DCH code processing section 22, an E-DCH modulation processing section 23, a downlink reception timing monitor/uplink transmission timing management section 24, and a transmitter 25.

That is, the UE 1 of this embodiment is configured to additionally include the E-DCH communication rate measurement section 16 and the CQI control section 17, in addition to the sections 201-222 included in an exiting UE 200 depicted in FIG. 9.

More specifically, the receiver 2 is adapted to receive a signal at a reception antenna (omitted from the drawing) and carry out path detection, despreading processing, or the like, as well as separating each of the CPICH, E-HICH, HS-SCCH, and HS-PDSCH channels.

In addition, the CQI report value calculation section 9 includes functions to calculate a CQI report value on the basis of the CPICH (pilot signal) separated by the receiver 2, measure the reception SIR of the downlink on the basis of the reception pilot signal, and calculate the CQI report value of the downlink on the basis of the measurement result.

The CQI report value calculated by the CQI report value calculation section 9 is input to the CQI control section 17 and undergoes table conversion processing that will be described later. The CQI report value undergoes code processing, modulation processing, and wireless transmission processing as a CQI control value through the CQI/ACK/NACK scheduling processing section (herein after, simply referred to as "scheduler") 18, the HS-DPCCH code processing section 19, the HS-DPCCH modulation processing section 20, and the transmitter 25, and is sent to the BS 30 on the HS-DPCCH. Note that the reception pilot signal is also used to determine channel estimation values of the HS-SCCH and the HS-PDSCH.

The HS-SCCH demodulation processing section 3 is adapted to demodulate the HS-SCCH separated at the receiver 2 with the channel being compensating using the channel estimation value obtained on the basis of the reception pilot signal. The HS-SCCH decode processing section 4 is adapted to decode the HS-SCCH from the HS-SCCH demodulation processing section 3. The result of the decode processing at the HS-SCCH decode processing section 4 is input to the HS-PDSCH decode processing section 6 since the result indication required for decoding the HS-PDSCH (e.g., the coding scheme, coding rate, or the like).

The HS-PDSCH demodulation processing section 5 is adapted to demodulate the HS-PDSCH separated at the receiver 2 with the channel being compensating using the channel estimation value. The HS-PDSCH decode processing section 6 is adapted to decode the HS-PDSCH using the decode processing result from the HS-SCCH decode processing section 4 and supply the result to the HS-PDSCH CRC calculation section 10.

The HS-PDSCH CPC calculation section 10 is configured to include a function to carry out a CRC calculation on the decode processing result from the HS-PDSCH decode processing section 6 thereby executing an error check. As a result, the decode data free from an error (having the CRC calculation result of being acceptable) is input to the downlink L2 data processing section 11 as a reception data on the downlink layer 2. Note that a reception (delivery) result confirmation information (ACK or NACK) as the CRC calculation result described above is input to the scheduler 18.

The downlink L2 data processing section 11 is adapted to carry out a predetermined L2 data processing on decoded data that has been determined as error free (the CRC calculation result is acceptable) in the error check at the HS-PDSCH CRC calculation section 10.

The L2 data buffer processing section 12 is adapted to control storage of downlink reception data from the downlink L2 data processing section 11 to the buffer 13 (buffer processing). The buffer 13 is adapted to store the downlink reception data under the control of the buffer processing section 12, and includes, for example, a dedicated or shared memory. More specifically, the UE 1 absorbs the difference in the communication rates between the uplink and the downlink between the UE 1 and the BS 30 by temporality storing downlink reception data from the BS 30 to the buffer 13, thereby assuring transmission processing on uplink data to be sent to the BS 30 in response to reception of the downlink data.

In addition, the E-HICH demodulation processing section 7 is adapted to demodulate the E-HICH separated at the receiver 2 with the channel being compensating using the channel estimation value. In addition, the E-HICH decode processing section 8 is adapted to decode the HS-SCCH from the E-HICH demodulation processing section 7.

This decode result is a delivery result confirmation indication corresponding to uplink transmission data on the E-DCH from the BS 30. As a delivery result confirmation indication, an ACK is decoded for uplink transmission data that is determined as error free by the BS 30 as, and a NACK is decoded for uplink transmission data that is determined having an error by the BS 30. These ACK and NACK are input to the E-DCH retransmission control processing section 15 via the E-DCH communication rate measurement section 16.

The E-DCH retransmission control processing section 15 is adapted to store uplink transmission data in a memory or the like for future retransmission control, and to obtain later the uplink transmission data for which the NACK has been decoded from the memory and carry out processing for transmission (retransmission) on the E-DCH.

The E-DCH communication rate measurement section 16 is adapted to measure the communication rate on the E-DCH (uplink transmission data rate) by monitoring the reception status of a delivery result confirmation indication (ACK or NACK) (the number of received ACKs/NACKs) on the E-DCH, for example. More specifically, the E-DCH communication rate measurement section 16 is adapted to carry out a function as a section that monitors the transmission (communication) rate on the E-DCH that is an uplink data channel to the BS 30. Note that the measurement (monitor) result on the communication rate on the E-DCH at the E-DCH communication rate measurement section 16 is input to the CQI control section 17.

The CQI control section (reducing section) 17 is adapted to reduce the CQI report value to be reported to the BS 30, i.e., the CQI report value calculated by the CQI report value calculation section 9 based on a result of the monitoring at the E-DCH communication rate measurement section 16 described above.

Figure 4:
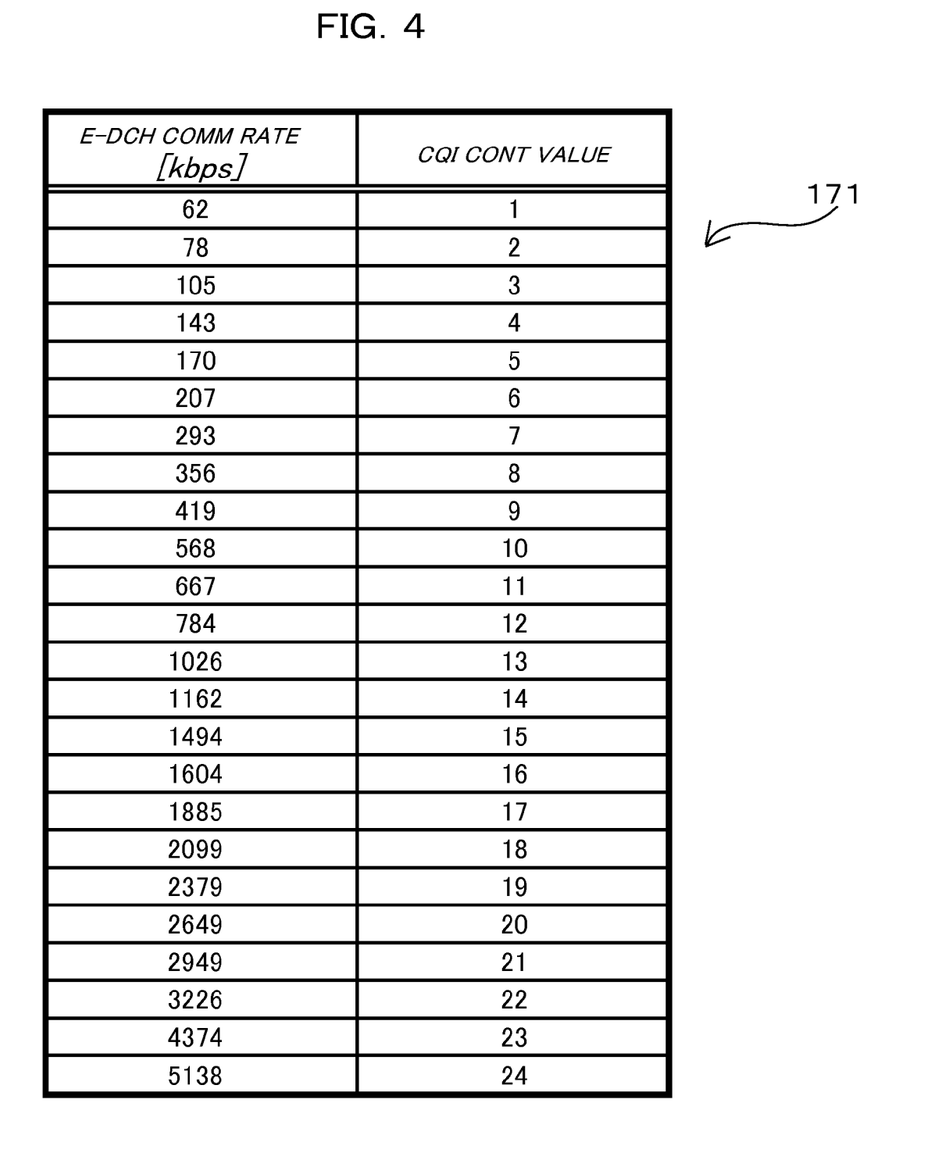
FIG. 4 is a diagram illustrating one example of an E-DCH communication rate/CQI conversion table that relates the E-DCH communication rates used in the UE depicted in FIGS. 1-3 to CQI values.

For this purpose, the CQI control section 17 of this example includes tabular data as depicted in FIG. 4 (E-DCH communication rate/CQI conversion table 171) which relates the communication rate on the E-DCH to a CQI report value to be reported to the BS 30 (CQI control value), for example. The conversion table 171 depicted in FIG. 4 contains CQI control values that are preset to value lowers than CQI report values that are to be set for the communication rate (kbps) on the E-DCH (i.e., CQI report values based on the reduction control). Note that the conversion table 171 is pre-stored a dedicated or shared memory that is internal or external to the CQI control section 17, for example.

Basically, the CQI control section 17 obtains the CQI control value by looking up the conversion table 171 on the basis of the measurement result by the E-DCH communication rate measurement section 16, and determines it as a value to be actually reported to the BS 30. For example, if the measurement result by the E-DCH communication rate measurement section 16 (the communication rate on the E-DCH) is 2379 [kbps], "19" is obtained as CQI control value from the conversion table 171.

Note that for the case where the CQI report value calculated by the CQI report value calculation section 9 becomes smaller than the CQI control value obtained for the conversion table 171, the CQI control section 17 selects and determines the smaller one of the two (when the two values match, either one may be used) as a value to be actually reported to the BS 30. More specifically, the CQI values are controlled to be reduced so that the smaller CQI value is always selected as the CQI value to be reported to the BS 30.

As described above, since the CQI control section 17 of this example calculates the CQI control value corresponding to the communication rate on the E-DCH using the conversion table 171 depicted in FIG. 4, it is possible to simplify the calculation of CQI control values and increase the speed of calculation processing at the UEs 1.

The scheduler 18 is adapted to schedule transmission processing of ACKs, NACKs, and CQI control values described above. Such information undergoes predetermined transmission processing trough the HS-DPCCH code processing section 19, the HS-DPCCH modulation processing section 20, and the transmitter 25, and is sent to the BS 30 on the HS-DPCCH.

More specifically, the HS-DPCCH code processing section 19 is adapted to include a function to carry out predetermined code processing, such as convolutional coding, turbo coding, on the information. The HS-DPCCH modulation processing section 20 is configured to include a function to modulate the coded information series with a predetermined modulation scheme, such as the QPSK, 16QAM, or the like.

The uplink L2 data processing section 14 is configured to include a function to generate uplink L2 data to be sent to the BS 30, as well as carrying out predetermined L2 data processing.

The E-DCH retransmission control processing section 15 is adapted to temporality store uplink L2 data from the uplink L2 data processing section 14 in a memory or the like for future retransmission control, and to obtain later the corresponding uplink L2 data from the memory when a NACK is notified as a delivery result confirmation indication for the uplink transmission data on the E-DCH from the E-HICH decode processing section 8 and carry out processing for resending on the E-DCH. Accordingly, both uplink L2 data to be newly sent and uplink L2 data for retransmission may be input to the uplink scheduling request processing section 21.

The uplink scheduling request processing section 21 is adapted to generate an SI for uplink in response to uplink L2 data is input from the E-DCH retransmission control processing section 15 (that is, if there is uplink transmission data to be sent to the BS 30). The E-DCH code processing section 22 is adapted to carry out predetermined code processing, such as convolutional coding or turbo coding, on the uplink SI generated by the uplink scheduling request processing section 21.

Further, the E-DCH modulation processing section 23 is adapted to modulate the uplink SI coded by the E-DCH code processing section 22 with a predetermined modulation scheme, such as the QPSK, 16QAM, or the like.

The transmitter 25 is adapted to carry out predetermined wireless transmission processing, such as amplification to the required transmission power, wavelength conversion to a radio frequency (RF) (upconversion), on modulation signals obtained at each of the HS-DPCCH modulation processing section 20, and the E-DCH modulation processing section 23 described above.

Accordingly, the uplink SI generated at the uplink scheduling request processing section 21 undergoes required code processing, modulation processing, and wireless transmission processing through the E-DCH code processing section 22, the E-DCH modulation processing section 23, and the transmitter 25, and is sent to the BS 30 on the E-DCH. In response, the UE 1 starts transmission of uplink transmission data on the E-DCH by receiving the uplink transmission permission (Grant) from the BS 30.

The downlink reception timing monitor/uplink transmission timing management section (herein after, simply referred to as "timing management section") 24 is adapted to generate a transmission timing signal that controls transmission timing on the HS-DPCCH and the E-DCH by the transmitter 25. More specifically, the timing management section 24 manages transmission timings (transmission slots) of the HS-DPCCH and E-DCH on the basis of the transmission timing (frame timing) determined by frame synchronization processing at the receiver 2, and controls transmission timing by the transmitter 25 to be a certain timing according to those transmission timings.

In the UE 1 according to one embodiment, a signal received at a reception antenna is input to the receiver 2 (omitted from the drawing), path detection, despreading processing, or the like are carried out in the receiver 2, and channels of the CPICH, E-HICH, HS-SCCH, and HS-PDSCH are separated. Among them, the CPICH (pilot signal) is input to the CQI report value calculation section 9 to calculate a CQI report value, and is input to the CQI control section. In addition, the HS-SCCH separated at the receiver 2 undergoes demodulation and decode processing by the HS-SCCH demodulation processing section 3 and the HS-SCCH decode processing section 4, respectively. The HS-PDSCH separated at the receiver 2 undergoes demodulation and decode processing by the HS-PDSCH demodulation processing section 5 and the HS-PDSCH decode processing section 6, respectively, and undergoes a CRC calculation and an error check at the HS-PDSCH CRC calculation section 10.

As a result, the decode data free from an error (having the CRC calculation result of being acceptable) is input to the downlink L2 data processing section 11 as a reception data on the downlink layer 2, and undergoes a predetermined L2 data processing. In addition, the CRC calculation result described above is input to the scheduler 18. ACK information in the case of the CRC calculation result being acceptable or NACK information in the case of the result being not acceptable is scheduling; undergoes code processing, modulation processing, and wireless transmission processing through the HS-DPCCH code processing section 19, the HS-DPCCH modulation processing section 20, and the transmitter 25; and is sent to the BS 30 on the HS-DPCCH.

In addition, the E-HICH separated at the receiver 2 is demodulated with the channel being compensated using the channel estimation value at the E-HICH demodulation processing section 7, and is further decoded by the E-HICH decode processing section 8 and input to the E-DCH communication rate measurement section 16.

The communication rate on the E-DCH is measured (monitored) by the E-DCH communication rate measurement section 16, and the measurement (monitor) result is input to the CQI control section 17.

The CQI control section 17 then calculates a CQI control value on the basis of the communication rate on the E-DCH monitor result and the CQI report value. The CQI control value is sent to the BS 30 via the scheduler 18, the HS-DPCCH code processing section 19, the HS-DPCCH modulation processing section 20, and the transmitter 25. Note that operations of other sections of the UE 1 are basically similar to those of the UE 200 described above.

On the other hand, since the BS 30 determines a transport block size of the downlink data and a downlink transport format on the basis of the CQI control value received from the UE 1, reduction in the communication rate in the downlink direction (Communication rate of the HS-PDSCH) is made possible in this example by setting the CQI control value to a value smaller than the CQI report value calculated by the CQI report value calculation section 9.

That is, the UE 1 monitors the communication rate on the E-DCH that is an uplink data channel to the BS 30, and control the CQI control value to be reported to the BS 30 so that it becomes smaller than the CQI report value to be reported to the BS 30 based on a result of the monitoring. Thereby, it is possible to request the BS 30 to reduce the communication rate of the HS-PDSCH that is a downlink data channel.

Thereby, it is possible to reduce the rate difference between the communication rate on the E-DCH and the communication rate on the HS-PDSCH, and to prevent the buffer processing on downlink data received on HS-PDSCH from overflowing. In addition, it is possible to enhance the throughput of the wireless communication system as a whole.

(B) Second Embodiment

In the above-described embodiment, the aspect is described in which CQI values are controlled according to the measurement results of the communication rate on the E-DCH. However, the processing status on L2 data at the downlink L2 data processing section 11 may be monitored and the CQI control described above may be carried out on the basis of the monitor result and the measurement result of the communication rate on the E-DCH. This variation will be explained with reference to FIG. 2.

Figure 2:
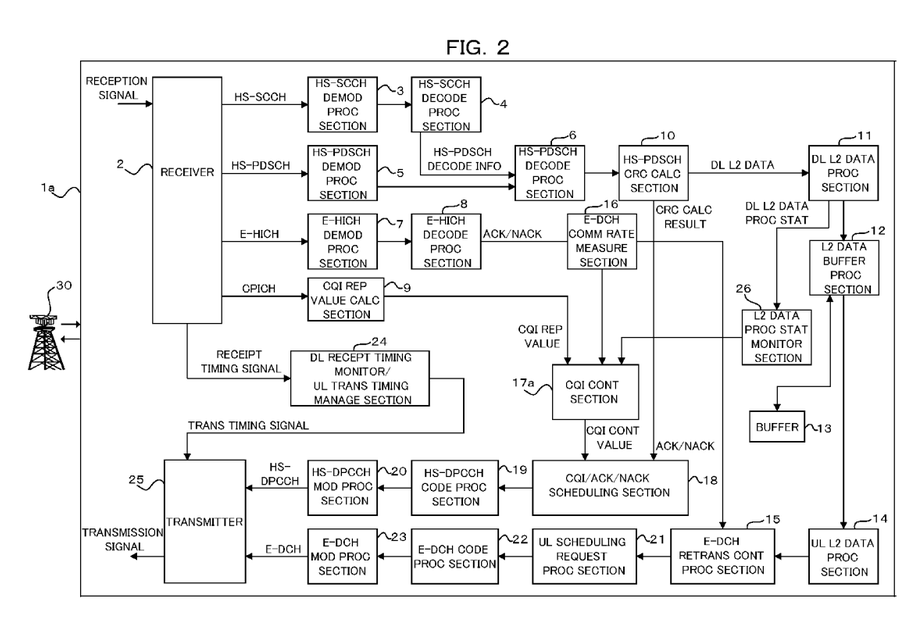
FIG. 2 is a block diagram illustrating a first variation of the UE depicted in FIG. 1.

FIG. 2 is a block diagram illustrating a configuration of the main portion of a wireless terminal (UE) according to a first variation of one embodiment described above.

That is, similar to the UE 1 depicted in FIG. 1, an UE 1a depicted in FIG. 2 is configured to include, for example, a receiver 2, an HS-SCCH demodulation processing section 3, an HS-SCCH decode processing section 4, an HS-PDSCH demodulation processing section 5, an HS-PDSCH decode processing section 6, an E-HICH demodulation processing section 7, an E-HICH decode processing section 8, a CQI report value calculation section 9, an HS-PDSCH CRC calculation section 10, a downlink layer 2 (L2) data processing section 11, a layer 2 (L2) data buffer processing section 12, a buffer 13, an uplink layer 2 (L2) data processing section 14, an E-DCH retransmission control processing section 15, an E-DCH communication rate measurement section 16, a CQI control section 17a, a CQI/ACK/NACK scheduling processing section 18, an HS-DPCCH code processing section 19, an HS-DPCCH modulation processing section 20, an uplink scheduling request processing section 21, an E-DCH code processing section 22, an E-DCH modulation processing section 23, a downlink reception timing monitor/uplink transmission timing management section 24, and a transmitter 25. However, the UE 1a is different in that the UE 1a includes an L2 data processing status monitor section 26 in addition to these, and the CQI control section 17a carries out CQI processing considering a monitor result at the L2 data processing status monitor section 26.

The L2 data processing status monitor section (data processing status monitor section) 26 is adapted to monitor the status of processing on L2 data (more specifically, reception data on the HS-PDSCH that is a downlink data channel) at downlink L2 data processing section 11, for example, status of progress of compression processing when compression of the downlink L2 data is required.

The CQI control section 17a of this example includes a function to control to carry out a CQI reduction control similar to that of the previous embodiment if it is determined that the downlink L2 data processing section 11 cannot handle all processing on L2 data on the basis of the monitor result of processing status on the L2 data processing at the downlink L2 data processing section 11 while reporting the CQI report value the BS 30 without modifying it which is calculated by the CQI report value calculation section 9.

More specifically, the CQI control section 17a and the L2 data processing status monitor section 26 function as a reducing section that reduces a CQI value to be reported to the BS 30 on the basis of a monitor result on E-DCH communication rate at the E-DCH communication rate measurement section 16 and a monitor result on a data processing status at the L2 data processing status monitor section 26.

The UE 1a of this variation configured as described above can carry out selective control in which the report CQI value to the BS 30 is reduced so that it becomes equal to or lower then the target CQI report value to be reported to the BS 30 if it is determined that downlink L2 data cannot be processed on the basis of the measurement result on the communication rate on the E-DCH measurement section 16 (the communication rate on the E-DCH that is an uplink data channel to the BS 30) and the monitor result at the L2 data processing status monitor section 26 (processing status of the downlink L2 data) while sending the CQI report value calculated by the CQI report value calculation section 9 to the BS 30 without modifying it. Note that detailed operations of other sections of the UE 1*a* are basically similar to those of the UE 1 described above.

Accordingly, the CQI control operation by the CQI control section 17*a* can be configured in more fine-tuned manner. In addition, it is possible to prevent the buffer processing on downlink data received on HS-PDSCH from overflowing due to the rate difference between the communication rate on the E-DCH and the communication rate on the HS-PDSCH, and to maintain normal communication with the BS 30, thereby enhancing the throughput of the wireless communication system as a whole.

(C) Second Variation

The first variation described above is described as monitoring the L2 data processing status at the downlink L2 data processing section 11 and controlling on CQI values on the basis of the monitor result and the measurement result on the communication rate on the E-DCH. However, the buffer processing status at the L2 data the buffer processing section 12 may be monitored and the CQI control described above may be carried out on the basis of the monitor result. This variation will be explained with reference to FIG. 3.

Figure 3:
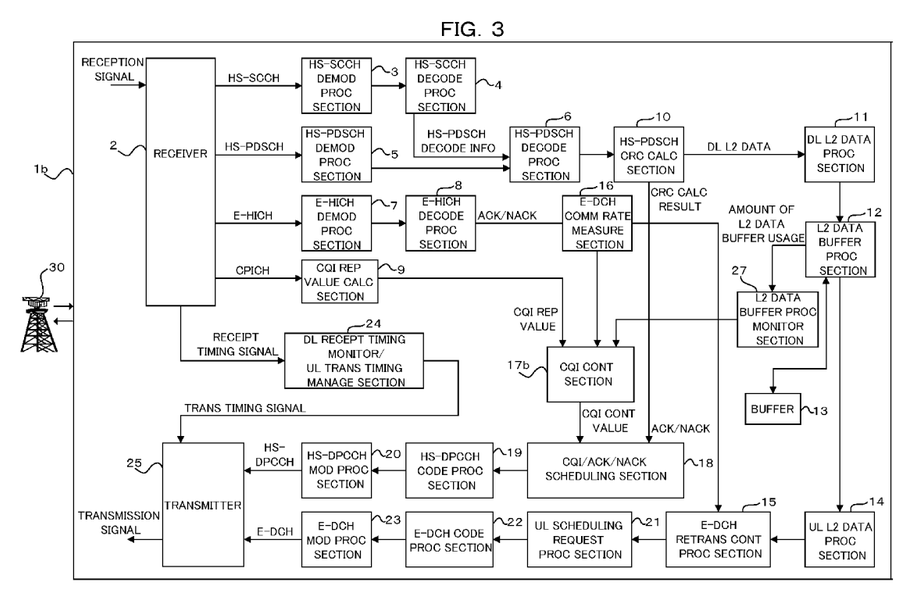
FIG. 3 is a block diagram illustrating a second variation of the UE depicted in FIG. 1.

FIG. 3 is a block diagram illustrating a configuration of the main portion of a wireless terminal (UE) according to a second variation of one embodiment described above.

That is, similar to the UE 1 depicted in FIG. 1, an UE 1*b* depicted in FIG. 2 is configured to include, for example, a receiver 2, an HS-SCCH demodulation processing section 3, an HS-SCCH decode processing section 4, an HS-PDSCH demodulation processing section 5, an HS-PDSCH decode processing section 6, an E-HICH demodulation processing section 7, an E-HICH decode processing section 8, a CQI report value calculation section 9, an HS-PDSCH CRC calculation section 10, a downlink layer 2 (L2) data processing section 11, a layer 2 (L2) data buffer processing section 12, a buffer 13, an uplink layer 2 (L2) data processing section 14, an E-DCH retransmission control processing section 15, an E-DCH communication rate measurement section 16, a CQI control section 17*b*, a CQI/ACK/NACK scheduling processing section 18, an HS-DPCCH code processing section 19, an HS-DPCCH modulation processing section 20, an uplink scheduling request processing section 21, an E-DCH code processing section 22, an E-DCH modulation processing section 23, a downlink reception timing monitor/uplink transmission timing management section 24, and a transmitter 25. However, the UE 1*b* is different in that the UE 1*b* includes an L2 data processing status monitor section 27 in addition to these, and the CQI control section 17*b* carries out CQI processing considering a monitor result at the L2 data processing status monitor section 27.

The L2 data buffer processing monitor section (data storing status monitor section) 27 is adapted to monitor a buffer processing status on L2 data at the L2 data the buffer processing section 12 (more specifically, reception data on the HS-PDSCH that is a downlink data channel), for example, the buffer usage of the buffer 13.

The CQI control section 17*b* of this example includes a function to control to carry out a CQI reduction control similar to that of the previous embodiment if it is determined that the L2 data processing section 2 cannot handle all processing on L2 data on the basis of the monitor result of buffer processing status on the L2 data processing at the L2 data buffer processing section 12 while reporting the CQI report value the BS 30 without modifying it which is calculated by the CQI report value calculation section 9.

More specifically, the CQI control section 17*b* and the L2 data buffer processing monitor section 27 function as a reducing section that reduces a CQI value to be reported to the BS 30 on the basis of a monitor result on E-DCH communication rate at the E-DCH communication rate measurement section 16 and a monitor result on a data processing status at the L2 data processing status monitor section 27.

The UE 1*b* of this variation configured as described above can carry out selective control in which the report CQI value to the BS 30 is reduced so that it becomes equal to or lower then the target CQI report value to be reported to the BS 30 if it is determined that downlink L2 data cannot be processed on the basis of the measurement result on the communication rate on the E-DCH measurement section 16 (the communication rate on the E-DCH that is an uplink data channel to the BS 30) and the monitor result at the L2 data buffer processing monitor section 27 (processing status of the downlink L2 data) while sending the CQI report value calculated by the CQI report value calculation section 9 to the BS 30 without modifying it. Note that detailed operations of other sections of the UE 1*b* are basically similar to those of the UE 1 described above.

Accordingly, the CQI control operation by the CQI control section 17*b* can be configured in more fine-tuned manner. In addition, it is possible to reliably prevent the buffer processing on downlink data received on HS-PDSCH from overflowing due to the rate difference between the communication rate on the E-DCH and the communication rate on the HS-PDSCH, and to maintain normal communication with the BS 30, thereby enhancing the throughput of the wireless communication system as a whole.

Although one embodiment and variations have been described in detail, the embodiments are not limited to the embodiment and variations described above and may be modified without departing from the spirit of the embodiments.

For example, an UE may includes both the L2 data processing status monitor section 26 and the L2 data buffer processing monitor section 27 in addition to the E-DCH communication rate measurement section 16. In this case, the control operation by the CQI control section may be configured in more fine-tined manner, which enables to more effectively and reliably prevent the buffer processing from the UE on overflowing and to maintain correct communication with a BS effectively and reliably. According to the embodiments described above, at least one of the following effects or advantage scan be obtained:

(1) A wireless terminal can make a wireless base station to reduce the transmission rate of the downlink data channel since the wireless terminal reduces the determined reception quality value based on the transmission rate of the uplink data channel (the reception quality value to be reported to the wireless base station). Accordingly, it is possible to prevent communication from being disrupted since a wireless terminal fails to absorb the difference in communication rates in uplink and downlink data channels, thereby increasing the throughput of the wireless communication system as a whole.

(2) In addition, since the reception quality value can be reduced on the basis of the monitor result and status of processing on data received on the downlink data channel, it is possible to maintain correct communication with a wireless base station effectively and reliably.

(3) Furthermore, since the reception quality value can be reduced on the basis of the monitor result and status of storage of data received on the downlink data channel, it is possible to reliably prevent overflow of the reception date at the wireless terminal and maintain correct communication with a wireless base station.

(4) In addition, it is configured so that a wireless terminal includes a table that relates a transmission rate of the uplink data channel to a reception quality value based on the reduction control, and to obtain a reception quality value related to the monitor result in order to carry out the reduction control. Thereby, reducing the reception quality value described above can be simplified, and the reduction control can be carried out rapidly while reducing the circuit scale and power consumption of the wireless terminal.

As described above, according to the embodiments, an UE can make a BS to reduce the transmission rate of the downlink data channel since the UE reduces the determined reception quality value based on the transmission rate of the uplink data channel (the reception quality value to be reported to the BS). Thereby, it is possible to prevent communication from being disrupted since an UE fails to absorb the difference in communication rates in uplink and downlink data channels, thus increasing the throughput of the wireless communication system as a whole. Accordingly, the present is considered as highly useful in the field of wireless communication, particularly in the field of mobile wireless communication where reception qualities are reported to BSs.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment has been described in detail, it should be understood that the various changes, substitutions, and alterations could be made hereto without departing from the spirit and scope of the invention.

What is claimed is:

1. A method for controlling communication in a wireless terminal, the method comprising:
    receiving, on the wireless terminal, a downlink data channel from a wireless base station;
    determining, on the wireless terminal, a reception quality value related to the downlink data channel;
    monitoring, on the wireless terminal, a transmission rate on an uplink data channel to the wireless base station;
    reducing, on the wireless terminal, the determined reception quality value based on a result of the monitoring at a timing of the determination for the determined reception duality value;
    reporting, on the wireless terminal, the reduced reception quality value to the wireless base station; and
    controlling, on the wireless base station, a transmission rate on the downlink data channel to the wireless terminal based on the reported reception quality value reduced by the wireless terminal.

2. The method for controlling communication in a wireless terminal according to claim 1, wherein
    the reporting is controlled based on the result of the monitoring and a processing status of data received on the downlink data channel.

3. The method for controlling communication in a wireless terminal according to claim 1, wherein
    the reporting is controlled based on the result of the monitoring and a status of storing data received on the downlink data channel.

4. A wireless terminal comprising:
    a receiver that receives a downlink data channel from a wireless base station;
    a determining unit that determines a reception quality value related to the downlink data channel;
    a monitor that monitors a transmission rate on an uplink data channel to the wireless base station;
    a controller that reduces the determined reception quality value based on a result of the monitoring by the monitor at a timing of the determination for the determined reception quality value; and
    a reporting unit that reports the reduced reception quality value to the wireless base station.

5. The wireless terminal according to claim 4, wherein
    the reporting unit comprises a table that relates a transmission rate on the uplink data channel to a target reception quality value to be reduced, and
    reduces the reception quality value based on the target reception quality value of the table corresponding to the transmission rate monitored by the monitor.

6. The wireless terminal according to claim 4, wherein
    the reporting unit comprises a data processing status monitor that monitors a processing status on data received at the downlink data channel, and
    reduces the reception quality value based on a result of the monitor by the monitor and a result of the monitor on the processing status on the data by the data processing status monitor.

7. The wireless terminal according to claim 4, wherein
    the reporting unit comprises a data storing status monitor that monitors an storing status on data received at the downlink data channel, and
    reduces the reception quality value based on a result of the monitor by the monitor and a result of the monitor on the storing status on the data by the data storing status monitor.

* * * * *